Aug. 30, 1932.  J. SCHRAMM  1,874,637
ANTISKID DEVICE
Filed Aug. 22, 1931
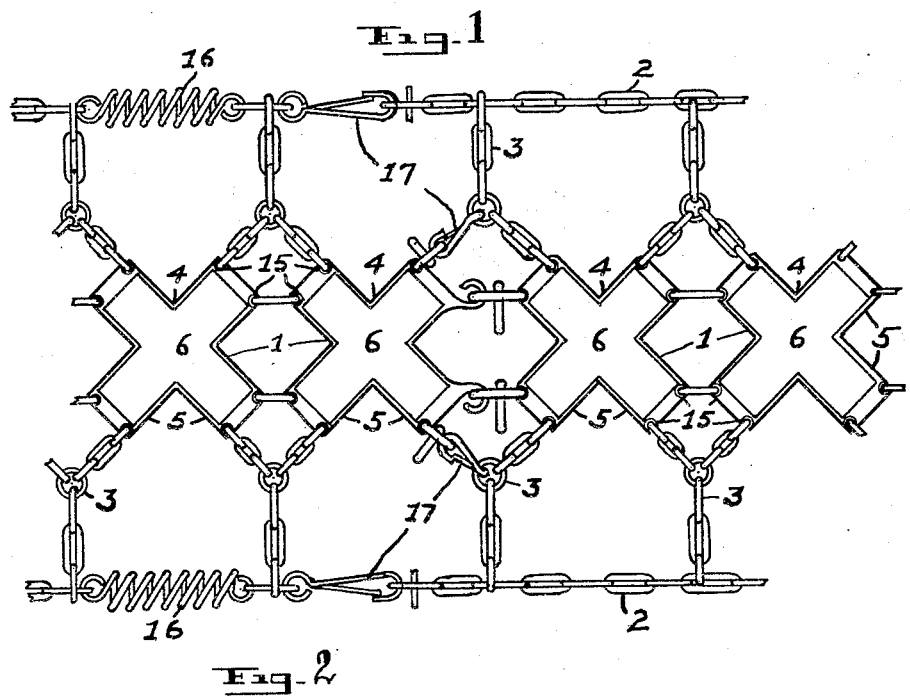
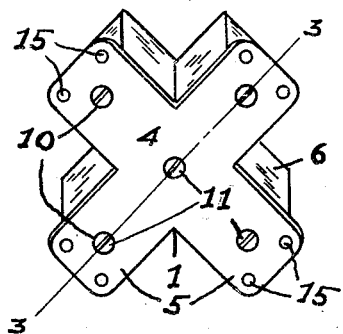
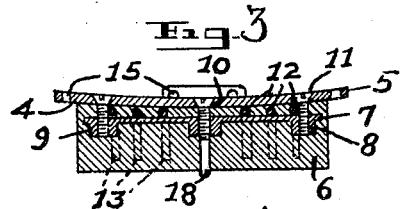
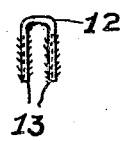
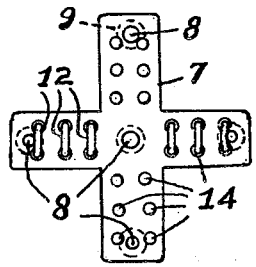
INVENTOR
Joseph Schramm
By Jas R Snyder
attorney Patented Aug. 30, 1932

1,874,637

UNITED STATES PATENT OFFICE

JOSEPH SCHRAMM, OF McKEES ROCKS, PENNSYLVANIA

ANTISKID DEVICE

Application filed August 22, 1931. Serial No. 558,685.

My invention relates to an anti-skid device for motor vehicle wheels, somewhat of the type disclosed in my United States patent numbered 1,700,272.

Important objects of the invention are to provide an anti-skid device of the character described, which will assure positive traction for and prevent skidding of motor vehicle wheels equipped therewith, and which embodies replaceable traction members whereby the latter may be removed when worn or damaged and new traction members can be substituted.

Further objects of the invention are to provide a device of the class stated, which is simple in its construction and arrangement, strong, durable and efficient in its use, attractive in appearance, positive in its action, and comparatively inexpensive to manufacture and maintain.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing, wherein like numerals of reference designate corresponding parts throughout the several views:—

Figure 1 is a fragmentary plan view showing the anti-skid device, constructed in accordance with the invention, at the connection of the ends thereof.

Figure 2 is a perspective view of a traction member.

Figure 3 is a sectional view on line 3—3, Figure 2.

Figure 4 is an inner side view of the reenforcing plate embodied in the tread member.

Figure 5 is a side view of the attaching clip.

Referring in detail to the drawing 1 denotes traction members, which are adapted to be mounted in circumferential alignment on the periphery of a wheel tire and secured in position by the usual parallel extending side chains 2 and the cross chains 3.

Each of the traction members 1 comprises a flat metallic supporting plate 4, which is substantially cross-shaped providing the four arms 5. The latter extend diagonally across the periphery of the wheel tire on which they are mounted and are preferably curved, as shown in Figure 3, to conform to the curvature of the associated wheel tire.

Each of the supporting plates 4 carries a rubber tread block 6, which is also cross-shaped and provided with a similarly shaped reenforcing plate 7. The latter is entirely embedded in the tread block 6 and is provided with a plurality of threaded apertures 8, each of which is formed in a boss 9 projecting outwardly from the outer side of the reenforcing plate 7. One of the apertures 8 is disposed in the center of the latter, and the other apertures 8 are disposed adjacent to the free ends of respective arms of the reenforcing plate 7.

Correspondingly positioned apertures 10 are provided in the supporting plate 1. The tread block 6 is secured to the supporting plate 4 by screws 11, which extend through the supporting plate apertures 10 and threadedly engage in the reenforcing plate apertures 8. Such attachment of the tread block 6 permits the convenient replacement of the latter when required.

If desired the screws 11 may be extended to project through the outer surface of tread block 6, as indicated at 18 in Figure 3, to function as cleats establishing additional traction.

The reenforcing plate 7 is further secured in the tread block 6 by a plurality of substantially U-shaped connecting clips 12 including legs 13 that are preferably burred, as shown in Figure 5, or otherwise roughed. The clips 12 overlap the reenforcing plate 7 and the legs 13 thereof extend through respective pairs of apertures 14 provided therefor in the reenforcing plate 7. The latter together with the connecting clips 12 are entirely embedded or molded in the tread block 6, and the burred legs 13 serve to maintain the latter in position against any adverse usage to which the device is necessarily subjected.

The free ends of the supporting plate arms 5 project beyond the adjacent ends of the similarly shaped tread block arms, and each corner thereof is provided with an aperture 15, which is adapted for the attachment of connecting links and the cross chains 3 therewith.

Each of the side chains 2 is provided with a spiral tension spring 16 for the purpose of resiliently holding the device on the wheel tire. For applying or attaching the structure to and from the tire a set of snap fasteners 17 are provided.

The present invention provides a most efficient device of its kind, which, owing to the replaceable tread blocks 6, may be employed indefinitely for effectively providing traction and to prevent skidding.

What I claim is:

In an anti-skid device for a motor vehicle wheel, the combination of a substantially cross-shaped supporting plate adapted for having its arms disposed diagonally across the periphery of the motor vehicle tire, a rubber tread block shaped to conform to said supporting plate, a reenforcing plate embedded in said tread block, a plurality of screws connecting with said supporting and reenforcing plates for detachably securing said tread block to said supporting plate, and a plurality of U-shaped clips connecting with said reenforcing plate and being embedded in said tread block for securing the latter to said reenforcing plate.

In testimony whereof I affix my signature.

JOSEPH SCHRAMM.